(12) United States Patent
David

(10) Patent No.: US 6,801,902 B1
(45) Date of Patent: Oct. 5, 2004

(54) METHOD AND SYSTEM FOR MANAGING DOCUMENTS IN A SYSTEM USING AT LEAST ONE DATABASE

(75) Inventor: Anja David, Dortmund (DE)

(73) Assignee: winrechte GbmH, Bremen (DE)

( * ) Notice: Subject to any disclaimer, the term of this patent is extended or adjusted under 35 U.S.C. 154(b) by 0 days.

(21) Appl. No.: 09/554,043

(22) PCT Filed: Nov. 10, 1997

(86) PCT No.: PCT/EP97/06228
§ 371 (c)(1),
(2), (4) Date: May 9, 2000

(87) PCT Pub. No.: WO99/24920
PCT Pub. Date: May 5, 1999

(51) Int. Cl.[7] .............................. G06F 17/30; G06F 7/00
(52) U.S. Cl. ............................................. 707/1; 707/205
(58) Field of Search ................................... 707/1–3, 205

(56) References Cited

U.S. PATENT DOCUMENTS

| | | | | |
|---|---|---|---|---|
| 5,388,257 A | * | 2/1995 | Bauer ............................. 707/1 |
| 5,499,358 A | * | 3/1996 | Nevarez ...................... 707/101 |
| 5,519,855 A | * | 5/1996 | Neeman et al. ................. 707/3 |
| 5,537,585 A | * | 7/1996 | Blickenstaff et al. ........ 707/204 |
| 5,544,051 A | * | 8/1996 | Senn et al. ...................... 707/3 |
| 5,634,051 A | * | 5/1997 | Thomson ........................ 707/5 |
| 5,737,736 A | * | 4/1998 | Chang .......................... 29/253 |
| 5,878,410 A | * | 3/1999 | Zbikowski et al. ............. 707/2 |
| 6,356,915 B1 | * | 3/2002 | Chtchetkine et al. ....... 707/200 |
| 6,453,325 B1 | * | 9/2002 | Cabrera et al. ............. 707/204 |

FOREIGN PATENT DOCUMENTS

| | | |
|---|---|---|
| EP | 0 032 194 | 7/1981 |
| EP | 0 550 368 | 7/1993 |
| EP | 0 665 499 | 8/1995 |
| WO | 95 16241 | 6/1995 |

OTHER PUBLICATIONS

Silberschatz et al. Operating System Concepts. 1995. Addison–Wesley Publishing Company. 4th Edition. pp. 372–377, 404–405, and 438–443.*

Berchtold et al. "SaveMe: A system for Archiving Electronic Documents Using Messaging Groupware". ACM. WACC '99. Feb. 1999. pp. 167–176.*

ANONYMOUS: "Induction of Rules for Document Classification", IBM Technical Disclosure Bulletin, vol. 36, No. 6B, Jun. 1993, New York, pp 495–498.

* cited by examiner

Primary Examiner—Greta Robinson
Assistant Examiner—Susan Rayyan
(74) Attorney, Agent, or Firm—Collard & Roe, P.C.

(57) ABSTRACT

A method for managing documents in a system comprising at least one electronic data processing installation for processing data by means of at least one data bank. A peripheral driver for electronic data processing installations which allows implementation of such a method. One aim is for simplifying and optimizing document management in electronic data processing systems by means of a data bank. For this purpose, document management is handled by a peripheral driver which is specific to the operating system and connected to the data bank. A improved embodiment of the invention, a data file system is provided for document management and the documents are managed by means of extended index features. The contents, of these extended index features is generated automatically or entered manually.

9 Claims, 6 Drawing Sheets

US 6,801,902 B1

METHOD AND SYSTEM FOR MANAGING DOCUMENTS IN A SYSTEM USING AT LEAST ONE DATABASE

CROSS REFERENCE APPLICATIONS

The applicant hereby claims priority under 35 U.S.C. §371 of PCT/EP97/06228 filed on Nov. 10, 1997. The international application under article 21 (2) was not published in English.

The present invention relates to a method for managing documents in a system comprising at least one electronic data processing installation for processing data by means of at least one data bank, and, furthermore, a peripheral driver for electronic data processing installations which permits implementation of said method.

BACKGROUND OF THE INVENTION

Documents are understood within the meaning of the present patent application to be both digital data files in different formats, and also complete application programs for electronic data processing installations consisting of one data file or a plurality of data files. Therefore, documents within the meaning of the present patent application are one data file or a plurality of data files with any type of information content.

It is known in the prior art that documents are managed by means of data banks installed in electronic data processing equipment. Different types of data banks such as, for example relational, object-oriented or full-text, but also combinations of different data banks are employed in this connection for different areas of application. Irrespective of which type of data bank is employed, such a data bank offers the advantage of having at its disposal comprehensive access and managing mechanisms, via which the documents filed therein, or the cross references to such documents, can be managed in optimized time frames and in a comfortable manner.

However, in order to make it possible for applications programs having no or only limited functional access to data banks, to make use of said comprehensive access and managing mechanisms of a data bank, a communications link has to be established between the data bank, on the one hand, and between the operating system and the application programs on the other hand. The application programs are then capable of accessing the data bank with the help of the operating system. In order to establish such a line of communication, suitable communiccation interfaces have to be available to both the operating system and/or the application programs, and also to the data bank. In addition, adaptations need to be arranged between said communication interfaces, which to a great extent are programmed individually and have to be adapted to the data bank and the respective application program. The adaptations are designed, for example as macros in the specific macro language of the respective operating system and/or application program. The application of new versions of application programs often requires a revision of the adaptations. Apart from the great expenditure required for generating, adapting and maintaining such adaptations, such a connection of communication between the application programs and the data bank is afflicted with other drawbacks. For example, programmed adaptations are application program-specific and have only limited access to the functionality of the given data bank environment.

Another possibility of managing documents in electronic data processing installations, which is known according to the prior art and currently widely implemented, is the management by means of a data file system. The management of documents by means of data file systems does in fact permit the documents and/or to the document attributes (to the extent such document attributes are available) to be accessed by the operating system or any given type of application program. Within data file systems of the type commonly employed at the present time, however, the individual documents are arranged in different indexes configured in a hierarchical form, which permits only limited document management. When searching for a certain document or document attribute, the various hierarchical levels of the data file system have to be searched sequentially (recursively), which may lead to long search times. Furthermore, the type and scope of the document attributes for managing the documents in the data file system are preset by the operating system and cannot be changed or extended by the user. Finally, no hierarchical management of storage media (e.g. an optical memory) for increasing the data safety is feasible in connection with the data file systems of the known type.

In order to counteract the drawback of lack of data safety in connection with data file systems, a hierarchical storage unit is known, for example from EP 0 665 499 A2, which comprises magnetic and optical storage media and a storage driver. A standard fixed-disk interface is reproduced on said storage driver by means of a peripheral driver configured in the form of an SCSI bus. The operating system and any desired type of application programs can access said interface. The hierarchical management of storage media is possible in connection with a data file system generated on the storage unit.

However, no search mechanisms of any type are made available by the storage unit disclosed in EP 0 665 499 A. The operating system and the application programs are in fact capable of accessing the storage unit directly via the standard fixed-disk interface, however, said system and said programs can only file selected documents in the storage unit, or retrieve such documents from said storage unit, whereas a targeted search for defined documents or document attributes is not possible. The disclosed hierarchical storage unit would thus be suited only in the form of a storage subsystem, for example for a data file system or a data bank, whereby the desired search mechanisms could be made available by such a data file system or data bank. However, so as to be able to make use of both the advantageous possibilities for accessing the storage unit from the operating system and the application programs, and the comfortable search and management mechanisms of the data bank, one would be faced again with the aforementioned problem posed by the communication connection between the operating system and the application programs, on the one hand, and the data bank on the other.

On the other hand, a data file system is known from WO 95/16 241, which is expected to counteract the drawback of the fact that the document attributes are limited by the operating system. Several quasi-data banks are subordinated to the data file system disclosed in said patent document, and the contents of the extended index features of the individual documents can be filed in said quasi-data banks. A cross-reference in the quasi-data bank finally refers to the document, which continues to be filed in the data file system as before.

With the data file system known from WO 95/16 241, the operating system and the application programs are in fact provided with the capability of accessing the documents filed in the data file system, and it is possible to search for certain documents and document attributes or for the contents of extended document index features. However, only the extended index features of an index entry of the data file system are contained in each case in one of the quasi-data banks. Therefore, when searching for defined documents and document attributes, or for the contents of extended document index features, it is necessary to first determine on the basis of the individual index entries of the data file system via cross-references the associated quasi-data banks, and the latter then have to be sequentially opened and searched, and subsequently closed again. Therefore, the search for a document with a defined document attribute content from the operating system or the application programs takes place not directly but always via the detour of the quasi-data banks. Such a two-stage search is extremely time-intensive and, in connection with great numbers of documents and document attributes as they are frequently filed, for example in a data bank in a network comprising a plurality of data processing installations, leads to long search times.

In summary, the conflict that exists between the goals can be elicited from the prior art specified above in the following way: documents and/or document attributes are either filed in data banks, with the availability of the advantageous search and management mechanisms associated with such data banks, but without having the possibility of accessing the documents or the document attributes by means of the operating system or any desired type of application programs, or the documents and/or document attributes are filed in data file systems, with the advantageous possibilities connected therewith for accessing such documents and/or document attributes, but without having the possibility of any comfortable, time-saving search for documents, or for managing such documents.

The problem of the invention originates from the drawbacks afflicting the prior art specified above, which problem is to provide a method for managing documents of the type specified above, such method permitting the operating system or any desired type of application program to directly access documents or document attributes filed in a data bank.

SUMMARY OF THE INVENTION

For solving said problem, the invention proposes that a document management is reproduced on the data bank by means of a peripheral driver with connection to the operating system of the electronic data processing installation. A vision of the document management is advantageously realized in the form of a data file system (virtual data file system).

However, it is also entirely conceivable to design the data management in a different way. In whichever way such management is configured, however, it is important in this connection that the operating system and/or the application programs are capable of directly accessing the documents and/or the document attributes via the data bank. The data bank, too, can be designed in any desired way. For example, it is conceivable that the data bank only contains the document attributes, and that the documents as such are filed in a magnetic tape library or a data file system located downstream, or that both the document attributes and the documents are filed in the data bank. The data bank could be designed, for example in the form of a relational, object-oriented and/or full-text data bank in a local data processing installation, and/or in the form of a divided data bank system in a network comprising a plurality of data processing installations.

Viewed from the aspect of the operating system or any given type of application programs, the documents and the document attributes appear to be filed in a conventional data file system. This has the advantage that the operating system and the application program are capable of directly accessing the documents and the document attributes via said data file system interface. However, the data file system is actually simulated only outwards; in reality, at least the document attributes, and selectively also the documents themselves, are filed in a data bank. Comprehensive search and management mechanisms are made available by such a data bank. This, in turn, has the advantage that the individual documents and document attributes can be accessed in a particularly quick and comfortable way, and that search processes can be decisively reduced especially where documents have to be managed in large numbers. Therefore, the method as defined by the invention for the management of documents is provided with the advantage that the operating system and any desired type of application programs are capable of directly accessing by way of the virtual data file system the individual documents and document attributes filed in a data bank. In addition, the operating system or any desired type of application programs are capable of fully exploiting the advantages offered by a data bank, such as short search times, comprehensive management possibilities, different types of documents, and management of large amounts of data without problems.

The data bank and the documents are reproduced in the form of a virtual, functional data file system. In the present context, functional means that the documents are viewed in this case as objects, i.e. no distinction is made between the documents and their contents, attributes and properties. The reproduction of the data bank and documents in a data file system takes place by means of a peripheral driver for electronic data processing installations, which is designed in the form of the control of a data bank. A document management interface is made available to the electronic data processing installation by the peripheral driver and can be accessed by the operating system or any type of application programs. The document management interface is advantageously realized in the form of a data file system interface. The peripheral driver converts commands received from the operating system or from the application programs into corresponding data bank commands, and reversely converts commands received from the data bank or data bank outputs into corresponding operating system or application program commands. It is possible by means of this process, which is referred to in data processing as mapping, to reproduce a virtual data file system in the data bank. In this way, the operating system and the application programs have direct access to the documents and document attributes filed in the data bank. As opposed to conventional data file systems, which are static in most instances, such mapping can be dynamically adapted to the requirements on part of the user. This entails high flexibility in the management of documents according to the method as defined by the invention, and consequently high operating comfort for the user.

The peripheral driver is adapted to a defined operating system. Via the peripheral driver, all application programs and application program versions operating in such a defined operating system have access to the virtual data file system as well. This has the advantage that different application programs can access the documents and document attributes in the data bank via one and the same peripheral driver. The use of new application program versions in the same operating system does not require any revision of the peripheral driver. This reduces the maintenance expenditure for the communication link between the data bank, on the one hand, and the operating system and the application programs on the other, which in turn leads to substantial cost savings. It is necessary only in the presence of different operating systems that a peripheral driver is made available that is specifically adapted to each of such different systems.

So as to make it possible for the operating system to communicate with the document management interface of the peripheral driver, the operating system has a suitable communication interface. Such an interface, for example realized in the form of a data file system interface, is present in almost all operating systems as a standard feature. If the operating system, moreover, has an extendable interface, it is possible for a peripheral driver realized with a correspondingly devised function control to make additional search and/or management functions available. To the user it appears that the additional functions constitute a fixed component of the operating system. Such additional functions make it possible that the method as defined by the invention for the management of documents in a system of data processing installations can be provided in the form of a highly optimized and extremely comfortable method.

Data banks usually comprise a multitude of different interfaces via which the data banks can be accessed by way of different routes (for example, relational data banks can be accessed by way of different interfaces with the data bank language SQL (System Query Language), and contents can be directly inserted in the data bank environment, or they can be erased or manipulated). This openness of the data banks is of course fully preserved also when the peripheral driver as defined by the invention is employed. The peripheral driver offers a particularly advantageous vision (for example as a virtual data file system) of the documents filed in the data bank; however, it does not limit the possibilities available for accessing the data bank. Each document on file in the data bank is visible to the user in the virtual data file system via the peripheral driver as defined by the invention even if such document has not been filed there via the peripheral driver.

The peripheral driver can be embodied in the form of hardware, for example as a plugin card for the master printed circuit motherboard of an electronic data processing installation, or in the form of additional driver software for installation with the operating system, or in the form of a combination of hardware and software.

The method for managing documents in electronic data processing installations took its origin based on the idea to optimize and standardize the management of documents in data banks or data file systems. By virtue of the direct access to the contents of the data bank as defined by the invention, the management expenditure is reduced because instead of using a plurality of different communications links, only one single peripheral driver as defined by the invention is employed for the communication between the data bank, on the one hand, and the operating system and the application programs on the other. By employing the peripheral driver, the access to a data bank from an operating system and from any desired type of application programs is standardized and simplified at the same time.

As amazingly simple the solution of the problem herein disclosed may appear, the advantages resulting from it are just as astonishingly effective and far-reaching. Above and beyond the advantages specified herein, the object of the invention has additional beneficial effects with respect to the operation and work with data banks and the access to and the management of documents in data banks, that are even not yet fully foreseeable to some extent. It is proposed according to a further developed embodiment of the invention that the documents are managed by means of extended index features. The document management or the data file system is expanded for said purpose into a document management system (DMS) The extended index features are, for example extended document attributes that contain document information extending beyond the usual attributes (data file names, extension, date, time, and others). Such extended document attributes are, for example the name of the user, information about access rights of third persons, as well as information about the life cycle management of the document within the data bank; the type of document involved, the kind of document; an invoice number, an invoice amount; or also the full text of the document. The type and scope of the extended index features can be changed or extended within wide limits by the user in almost any desired way.

Additional search and/or management mechanisms are made available by managing the documents by means of extended index features. Such mechanisms can be accessed especially by operating programs. The additional management and search functions of the DMS are executed by the peripheral driver as well. In addition to the data file system interface, the peripheral driver has for this purpose an additional DMS-interface, which the application programs can access directly. Application programs that have a suitable communication interface can support and exploit the extended index features and the extended functionalities resulting therefrom. The documents in the data bank can then be managed from said application programs in an optimal and particularly comfortable way.

The contents of the extended index features are automatically generated according to another advantageous embodiment of the invention. For example it is possible that the user name, or information about access authorizations of third parties are automatically taken over by the electronic data processing installation and filed in the data bank. This has the advantage that the user can make use of the variety of search and management mechanisms of a databank with extended index features without first having to enter the contents of all index features.

According to another embodiment of the invention, the automatically generated contents of the extended index features can be extracted from the documents as well. Such extracted contents of the index features are, for example the name of the author, the title or an abstract of the document, a text of a document present in the facsimile format detected by optical character recognition (OCR), or an invoice number detected by means of bar code recognition. But it is also possible to automatically extract the entire text from any desired document and to file such text in a data bank with full-text capability.

For another embodiment of the invention it is proposed that the contents of the extended index features are entered manually. Before a document is stored or searched, for example, a query appears for this purpose on the video screen of the electronic data processing installation, requesting the user to manually enter the contents of defined extended index features via the keyboard of the data processing installation. The video screen query is controlled either by the peripheral driver itself or by one of those application programs that are capable of accessing the data bank via the data file system interface and the DMS interface of the peripheral driver.

According to an advantageous embodiment of the invention it is proposed that the data bank is supplemented by a magnetic tape library. A magnetic tape library serves for the long-term storage of documents in order to increase the data safety in data banks. A magnetic tape library usually consists of a combination of rapid, re-writable storage media such as, for example a magnetic fixed disk, and slower storage media such as, for example a WORM (Write Once Read Many) that can be written once and read many times in most cases, or a CD-R (CD-Recordable). Such a so-called hierarchical storage management permits short access times for accessing frequently needed documents that are filed on the rapid storage media, on the one hand, and safe long-term filing of rarely needed documents, which are filed on the WORM storage media. Via the peripheral driver the operating system and the application programs thus have free access to a data bank having a DMS and a magnetic tape library. The operating system and the application programs therefore are also provided with possibilities for rapidly accessing documents that have already been filed in a magnetic tape library for longer-term storage.

According to a special further development of the invention it is proposed that the data bank and the peripheral driver are realized in one single electronic data processing installation. The advantages offered by the method as defined by the invention for managing documents come clearly to bear even in only one single electronic data processing installation. For example, the operating system and any desired application programs are capable of communicating with the data bank via one single peripheral driver, which substantially reduces the management expenditure for the communication connection. Combined with said capability is the highly optimized, standardized and comfortable access to documents via the data bank or via the data file system impressed upon the data bank.

According to another advantageous development of the invention it is proposed that at least one data bank and several peripheral drivers are realized in a system comprising a plurality of electronic data processing installations connected to form a network. Such a network usually has at least one data processing installation (client) arranged on the user side, and at least one data processing installation for controlling the network (server). The data bank is normally installed in the server. All application programs installed in clients with peripheral drivers as defined by the invention have access via the data file system to the documents filed in the server. The server in turn has a corresponding network interface in order to make the communication with the peripheral drivers of the clients possible. The advantages offered by the method as defined by the invention for managing documents in data processing installations are made clear especially in connection with complex networks where documents have to be managed in large amounts. Said benefits include the highly optimized management and search mechanisms via the network, and the possibility of directly accessing the documents and document attributes in the data bank in the server from the operating system and the application programs of any desired clients. The communication between the data bank on the side of the server and the application programs on the side of the client is made substantially simpler and clearer by the peripheral driver as defined by the invention. Only one single adaptation is still required between the application programs and the data bank, namely the peripheral driver, irrespective of the number of application programs available in a client.

BRIEF DESCRIPTION OF THE DRAWINGS

A preferred embodiment of the invention is explained in greater detail in the following with the help of the drawings, in which.

DETAILED DESCRIPTION

Figure 1:
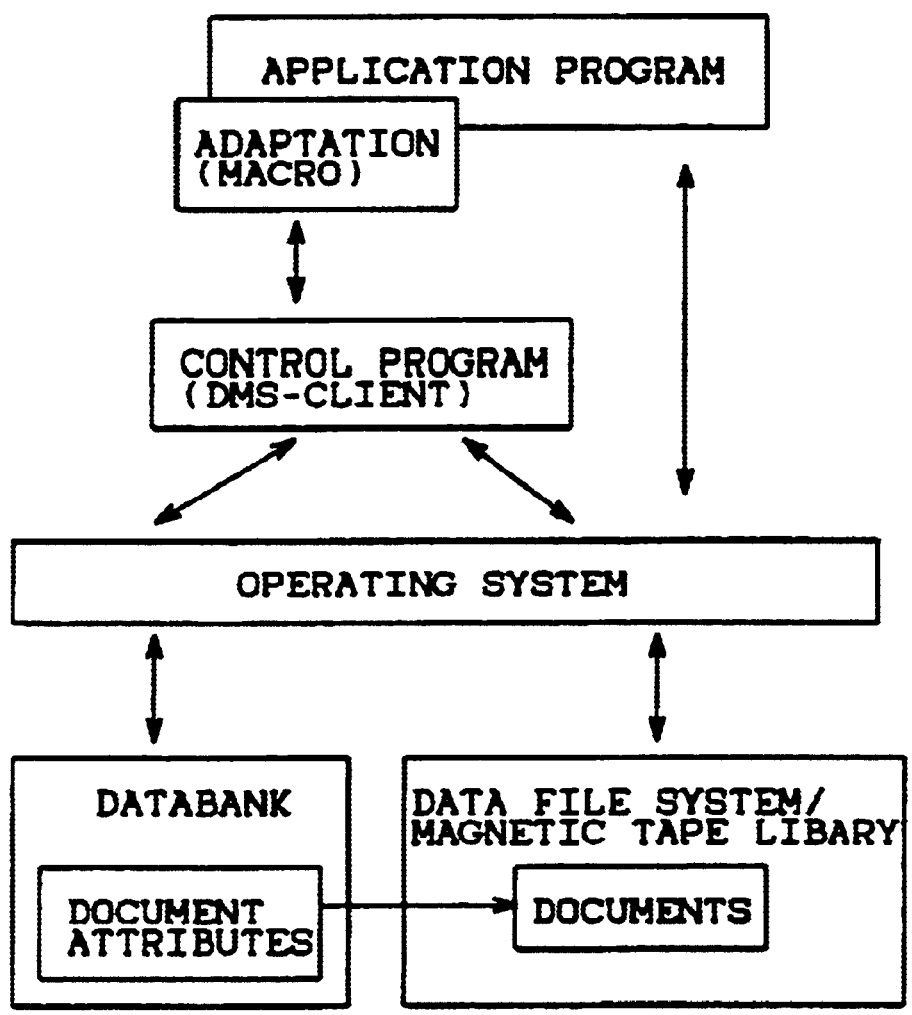
FIG. 1 is a schematic representation of a method for managing documents by means of a data bank and adaptations according to the state of the art.

FIG. 1 shows a method for managing documents in electronic data processing installations by means of a data bank as it is known from the prior art. Data banks have comprehensive access and management mechanisms by way of which the documents filed in such data banks can be managed in a time-optimized and comfortable manner. However, for the purpose of providing application programs having no or only limited functional access to data banks with the possibility of using such comprehensive access and management mechanisms of a data bank, a communication link has to be established between the data bank, on the one hand, and the operating system and the application programs on the other. In FIG. 1, an adaptation configured in the form of a macro is arranged for said purpose between an operating program and the data bank. The application program communicates with the data bank via the macro and a control program configured in the form of a document management system client, and is provided in this way with the capability of employing the comprehensive search and management functions of said data bank for managing the documents by means of document attributes and extended index features. For searching for a document, the user transmits a search query for a defined document attribute content to the data bank by way of the macro or the DMS client. Following the selection of a result data record, the document is retrieved from the data file system or the magnetic tape library system via a cross-reference, and transferred via the macro or the data file system to the application program (see the direct arrow connection between the application program and the operating system).

Some application programs also permit direct access to the data bank without having to make the detour via the adaptation and the control program. However, said type of access to a data bank, which is only rarely found in practical applications, requires that the application program permits direct access to the data bank, and that the data bank has a communications interface that can be directly addressed out of the application program, for example by means of a macro.

Furthermore, with both types of access to the data bank, the individual macros are strictly adapted to (proprietarily) the given application program, and much work and time expenditure is required for generating and maintaining the many different macros for the individual application programs.

Figure 2:
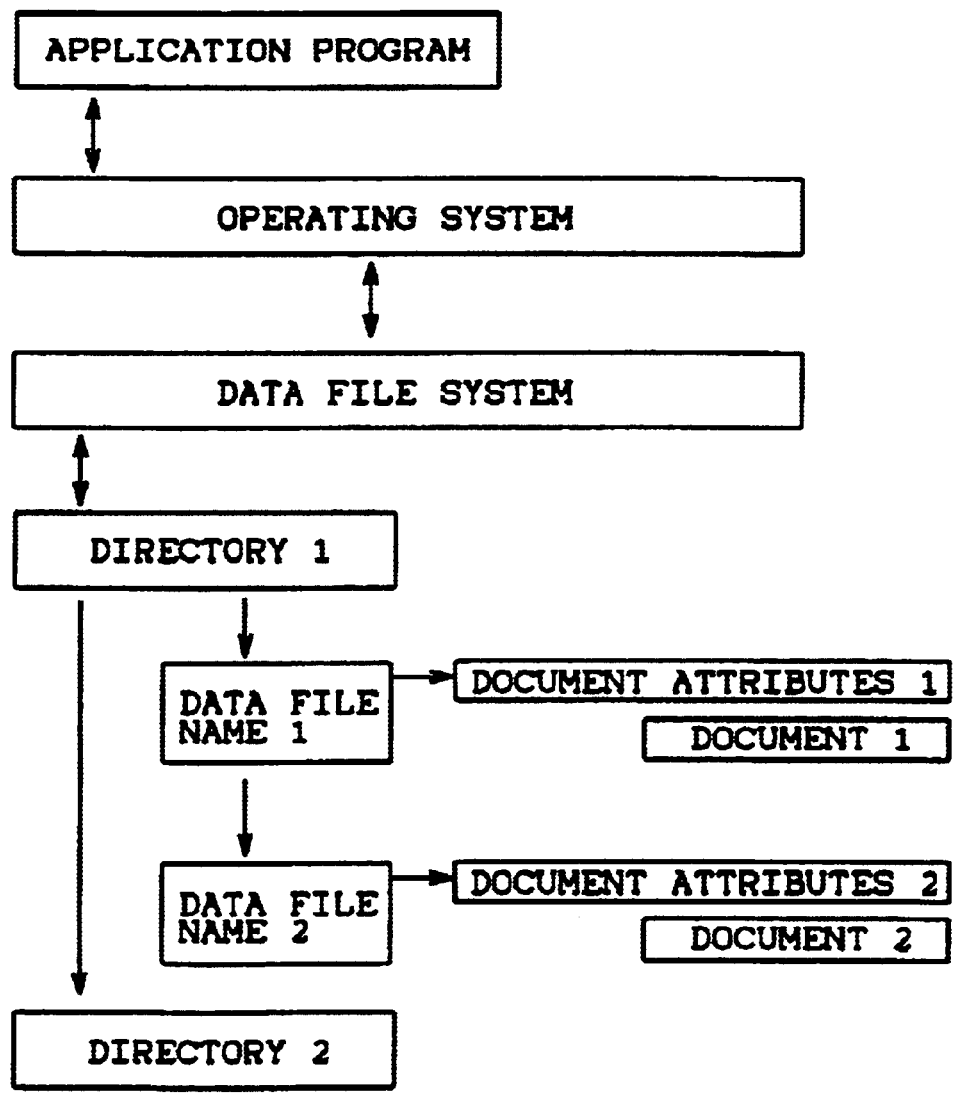
FIG. 2 is a schematic representation of a method for managing documents by means of a data file system according to the state of the art.

FIG. 2 represents another method for managing documents in electronic data processing installations. Said method is known from the prior art as well and widely employed at the present time. In connection with said method, the documents are filed in the individual directories of a data file system. An application program and the operating system, in the manner known, have direct access to the documents and the document attributes via the data file system. However, search or management mechanisms are hardly made available by a data file system. The search for a defined document or document attribute content in the data file system is executed sequentially (recursively), and is for that reason extremely time-intensive mainly in cases where documents have to be managed in large quantities. Furthermore, the type and scope of the document attributes for managing the documents in the data file system are preset by the operating system and can neither be changed nor extended by the user. Finally, no hierarchical management of storage media (e.g. optical memory) for increasing the data safety is feasible in connection with the known data file systems.

Figure 3:
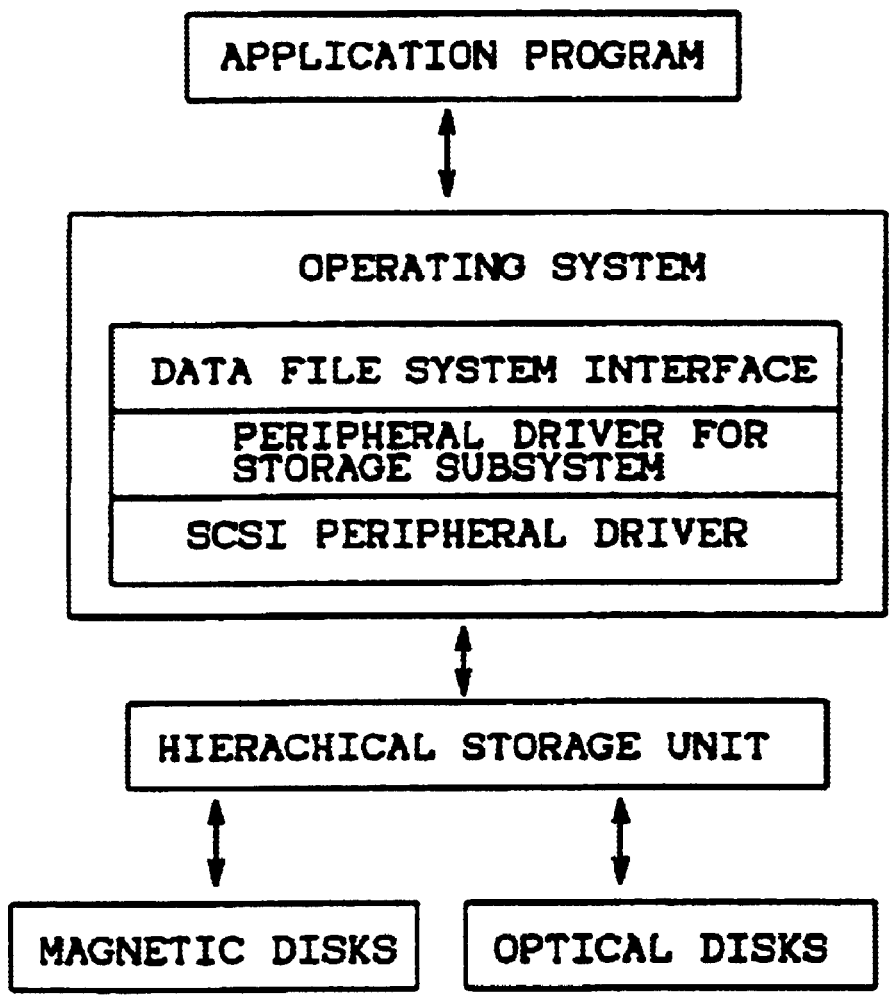
FIG. 3 is a schematic representation of a method for managing documents by means of a data file system with a subordinated magnetic tape library system according to the state of the art.

The hierarchical storage unit schematically shown in FIG. 3 of EP 0 665 499 A2 is known, for example, for counteracting the drawback of lack of data safety in connection with data file systems. A data file system is generated on said storage unit that permits a hierarchical management of storage media. An SCSI-bus peripheral driver reproduces for said purpose a data file system in a magnetic tape library system. Via the data file system interface of the peripheral driver, the individual application programs of the type of a data file system as shown in FIG. 2 have direct access to the tape library system where the individual documents with the document attributes are filed. However, no search mechanisms at all are made available by the storage unit according to FIG. 3. Said storage unit would be suitable only as a storage subsystem for a data file system or a data bank.

Figure 4:
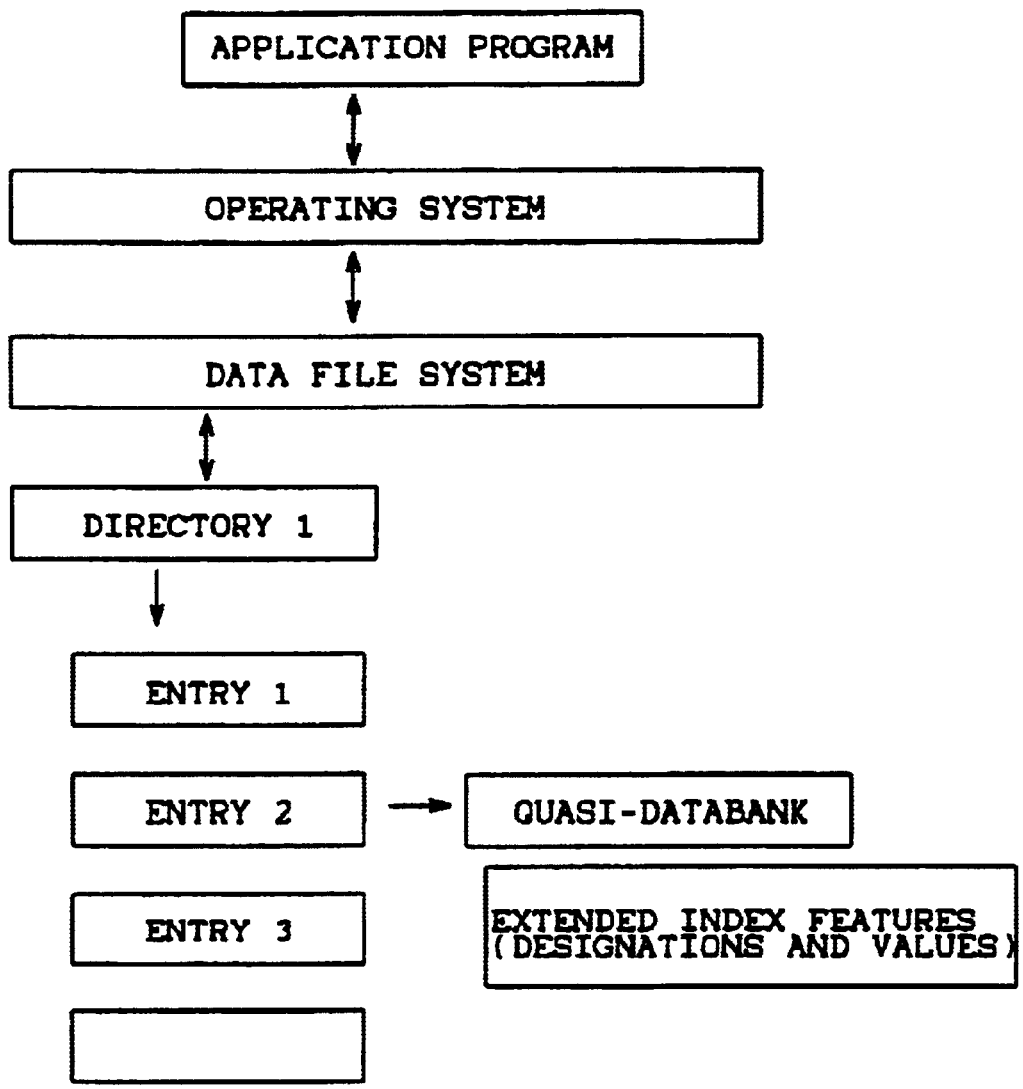
FIG. 4 is a schematic representation of a method for managing documents by means of a data file system with associated quasi-data banks according to the state of the art.

On the other hand, FIG. 4 shows a data file system as it is known, for example from WO 95/16 241. With said system, the documents are filed in the individual directories of a data file system as known from FIG. 2. An application program and the operating system have direct access to the documents and document attributes via the data file system in the known way. The contents of the individual directory entries of the data file system refer for each document to a corresponding quasi-data bank, where designations and values of the extended index features are filed. However, the search for a document with a defined document attribute content from the operating system or from an application program takes place not directly but always via the alternate route of the quasi-data banks. Such a two-stage search is extremely time-intensive and leads to extremely long search times in connection with a large number of documents and document attributes, because the designation of the index feature in the quasi-data bank has to be compared first before the value (content) can be checked.

Figure 5:
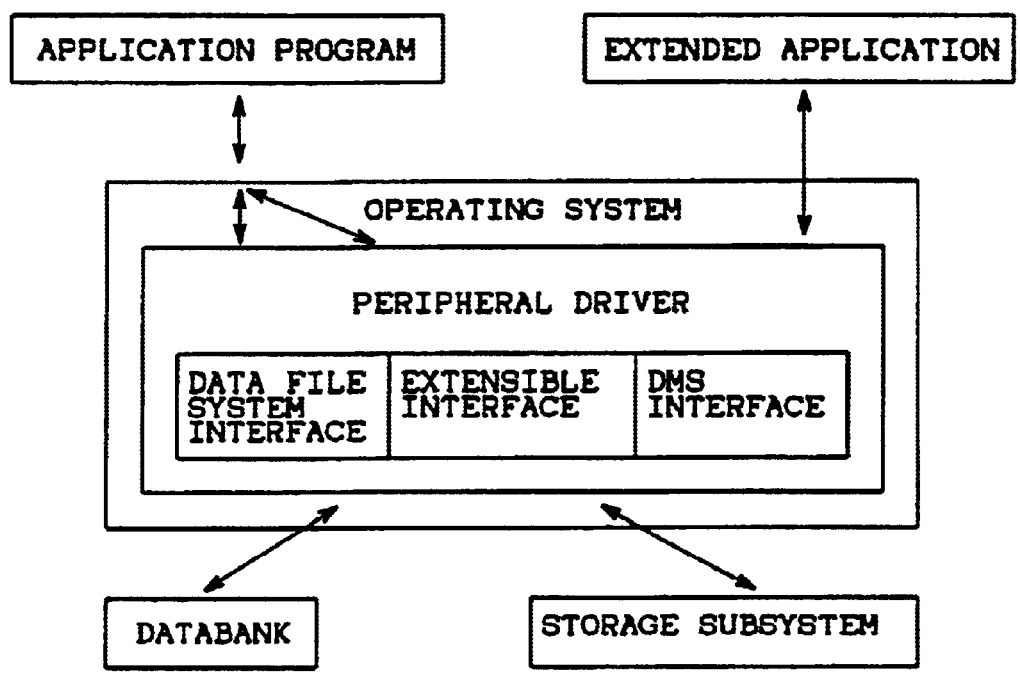
FIG. 5 is a schematic representation of the method for managing documents as defined by the invention.

Against the background of the state of the art shown in FIGS. 1 to 4 the invention proposes the method schematically shown in FIG. 5 for optimizing the management of documents in data processing installations. In connection with said method, a data file system is reproduced by means of an operating system-specific peripheral driver in association with the data bank.

The operating system and the application programs have direct access to the data bank and the document attributes filed therein by way of a data file system interface of the peripheral driver. The documents themselves are filed either in the data bank as well, or in a storage subsystem (e.g. a magnetic tape library). A virtual data file system is made available to the operating system (and to the application programs) by the peripheral driver, and the operating system and the application programs can directly access the data bank via said virtual data file system. For this purpose, the peripheral driver converts commands from the operating system or from the application programs into corresponding data bank commands, and vice versa converts commands from the data bank or data bank outputs into corresponding operating system or application program commands (mapping).

On the other hand, the operating system and the application programs are capable also of employing the comprehensive search and management functions of a data bank, said functions being known per se. By employing a document management system interface (DMS interface) it is possible to additionally manage the documents by means of extended index features. Application programs having a suitable communications interface (extended application programs) can support and use the extended index features and the extended functionalities resulting therefrom. The documents in the data bank can then be optimally and particularly comfortably managed from said application programs.

Furthermore, the peripheral driver as defined by the invention can make available additional search and/or management functions with the help of an extended interface. It appears to the user that the additional functions are a fixed component of the operating system. Said additional functions, however, are in fact made available by a corresponding function control of the peripheral driver. The additional functions permit the method as defined by the invention for managing documents in a system of data processing installations to be configured in the form of a highly optimized and comfortable process.

Figure 6:
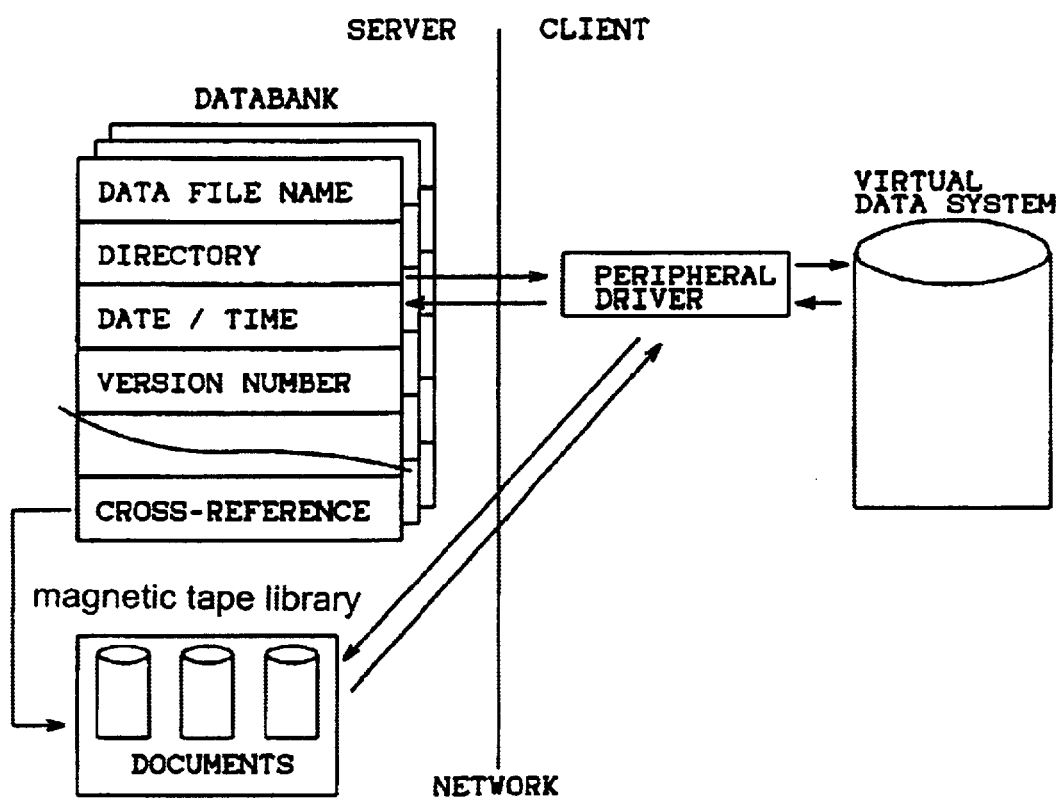
FIG. 6 shows the method as defined by the invention for managing documents in a plurality of data processing installations connected to each other to form a network.

The method as defined by the invention for managing documents in a system comprising a plurality of electronic data processing installations combined to form a network, is schematically shown in FIG. 6. As an example of such a network, FIG. 6 shows a data processing installation (client) arranged on the user side, and a data processing installation for controlling the network (server). The data bank with the contents of the document attributes filed in said data bank, and with cross-references to the respective documents, is installed in the server. The documents as such are filed in a magnetic tape library installed in the network server, or filed in their own tape library server. The client has a peripheral driver as defined by the invention, and application programs (not shown) installed in the client can directly access the document attributes and the documents via the virtual data file system.

The method as defined by the invention permits a management of documents in data processing installations in a substantially optimized manner. Furthermore, the access of an operating system and of application programs to a data bank is standardized and simplified and, at the same time made significantly more comfortable for the user by virtue of the peripheral driver as defined by the invention.

What is claimed is:

1. A method of managing documents in a system of at least one electronic data processing device by means of at least one databank comprising the following steps:

a) reproducing a document management process via an operating system specific peripheral driver in cooperation with the databank;

b) providing a document management interface via said operating system specific peripheral device driver, wherein the document management interface is in the form of a virtual data documents managed by said databank in a manner corresponding with the operating system specific access to documents stored in a data file system; and c) controlling the databank via said document management interface wherein said operating system specific peripheral driver converts commands of the operating system into databank commands, and transforms the databank outputs into operating system outputs.

2. The method as in claim 1, further comprising the step of managing the documents by means of a content of at least one expanded index feature.

3. The method as in claim 2, further comprising the step of generating automatically the contents of the expanded index feature.

4. The method as in claim 2, wherein said step of managing the documents includes extracting the contents of said at least one expanded index feature.

5. The method as in claim 2, further comprising the step of inputting manually the contents of said at least one expanded index feature.

6. The method as in claim 2, further comprising the step of supplementing the databank with an archive.

7. The method as in claim 1, wherein said step of reproducing a document management occurs on one single electronic data processing device.

8. The method as in claim 1, wherein said step of reproducing a document management occurs on a plurality of electronic data processing devices linked to a network.

9. A device driver for an operating system comprising:

a) a document management interface in the form of a virtual data file system interface comprising means for accessing documents managed by said databank in a manner corresponding with the operating system specific access to documents stored in a data file system for managing; and b) means for converting a set of commands of the operating system into a set of commands of the databank and a set of outputs of the databank into a set of outputs of the operating system.

* * * * *

UNITED STATES PATENT AND TRADEMARK OFFICE
CERTIFICATE OF CORRECTION

PATENT NO. : 6,801,902 B1
DATED : October 5, 2004
INVENTOR(S) : David

It is certified that error appears in the above-identified patent and that said Letters Patent is hereby corrected as shown below:

<u>Column 1,</u>
Line 1, after the word "data", please insert the phrase: -- file system interface, and comprises means for accessing --.

Signed and Sealed this

Fourth Day of January, 2005

JON W. DUDAS
*Director of the United States Patent and Trademark Office*